Jan. 15, 1935.    E. G. STRECKFUSS    1,988,256
SLICING MACHINE
Filed June 23, 1931    2 Sheets-Sheet 1

INVENTOR.
ELMER G. STRECKFUSS
BY Allen & Allen
ATTORNEYS.

Jan. 15, 1935.　　　E. G. STRECKFUSS　　　1,988,256
SLICING MACHINE
Filed June 23, 1931　　2 Sheets-Sheet 2

INVENTOR.
ELMER G. STRECKFUSS
BY Allen & Allen
ATTORNEYS.

Patented Jan. 15, 1935

1,988,256

UNITED STATES PATENT OFFICE 1,988,256

SLICING MACHINE

Elmer G. Streckfuss, Cincinnati, Ohio, assignor to The Cincinnati Time Recorder Company, Cincinnati, Ohio, a corporation of Ohio Application June 23, 1931, Serial No. 546,345

3 Claims. (Cl. 146—102)

My invention relates to machines for slicing meat or the like, and more especially to such machines employing a rotating disc as the cutting element.

As is well known in the art, there is a great variety of machines of the above general type employed for cutting bread, meat and the like; and some attempts have been made to make such machines slice meat containing bone. A primary difficulty in doing this with a toothed cutting disc has been the tearing of the meat, attended with clogging of the machine; and a further and serious trouble has been due to the collection of the bone dust on the meat, which, of course, is highly objectionable in the first place, and further, if the meat is kept for awhile this bone dust turns dark and gives to the meat a very bad appearance, making it practically unsalable. It is prohibitive to remove this bone dust by washing or otherwise, and even were this attempted complete removal of the dust would be practically impossible, and of course, the meat with such dust on it and embedded in it would be highly unsatisfactory to the customer. The result of these difficulties has been, so far as I am aware, a total absence of any practical machine on the market for slicing both the meat and the bone rapidly, smoothly and cleanly, delivering the slices of meat and bone directly from the machine in shape for an immediate wrapping and delivery to the customer in fully the satisfactory manner which attends the slicing of meats without bone. It is these latter that the use of slicing machines practically has been confined to; that is such meats as bacon and the like, containing no bones.

It is the object of my invention to overcome the above difficulties by applying the composite meat and bone material and the cutting disc together in such a way and with the aid of such adjuncts as to avoid tearing of the meat and the clogging resulting therefrom, as well as to avoid clogging or jamming in the cutting of the bone. This object comprehends the slicing not only of firmer kinds of meat containing bone, but also such meats as steaks, chops and the like, wherein, as will be understood, the bone has no firm support by the meat.

A further object is to practically eliminate the deposit of the bone dust on any part of the meat, thereby overcoming all of the difficulties just described.

A further object is to provide for the ready separation of such parts of the machine as specially and frequently require cleaning so as to materially make the machine more sanitary.

Other objects will appear in the course of the following description illustrated by the accompanying drawings, in which.

Figure 1:
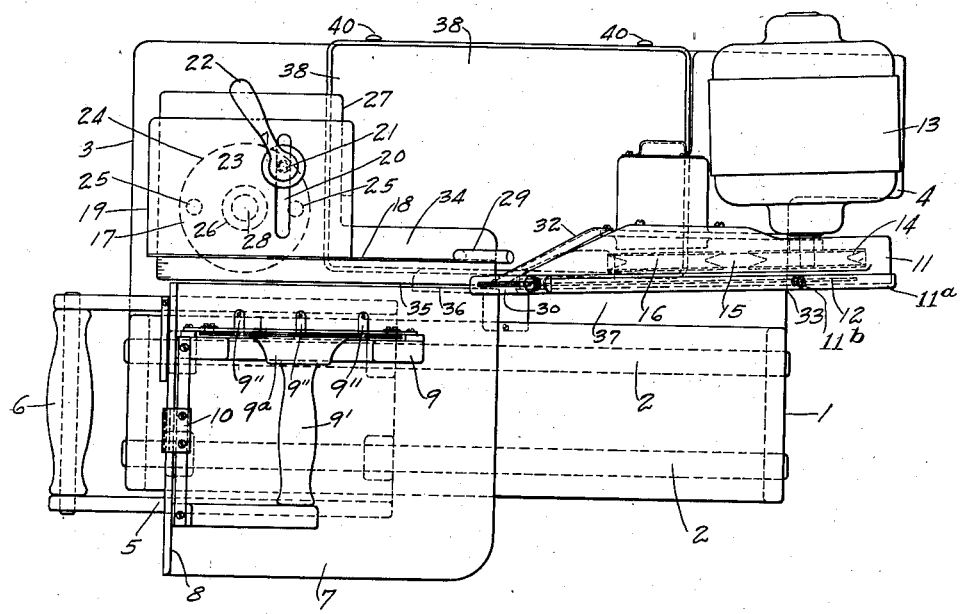
Figure 1 is a plan view of a slicing machine embodying my invention.

In the example herein there is the base 1, comprising a forward part with rods 2, and extending back from this forward part at the feed end an extension 3, while at the opposite end an extension 4 extends back. On the front guide rods 2 the carriage 5 slides; having at its outer end a handle 6 grasped by the user for this purpose. The plate 7 is secured on top of the carriage extending out thereapast at front and ear and in feeding direction, and has at its end near the handle 6 the upturned wall 8. The holder 9 is mounted on the plate 7 by a suitable sliding attachment 10 engaging the upper edge of the wall 8. This holder is provided with the handle 9' extending forwardly from it; and on its rear face it has spurs 9" that extend backward a very short distance and then extend downward a considerably greater distance. This holder differs from prior holders, including certain ones of my invention, in that the spurs 9" are much fewer and considerably more spaced apart for reasons that will hereinafter be more fully described.

The guard housing comprises a rear part 11 which projects up from the rear edge of the forward part of the bed 1 over at the end next to the rear projection 4 and a removable front rim 11a held on the rear part 11 by thumb nuts 11b; and in this housing the toothed disc 12 is journaled and partially enclosed. A motor 13 is mounted on the extension 4 of the base and has a pulley 14 with a belt 15 passing around it and around a similar pulley 16 with which the disc 12 turns.

The rearward extension 3 at the feed end of the machine receives a base or pedestal 17 which supports the slice-adjusting plate which comprises an upright part 18 facing toward the holder 9 and a lower rearwardly extending part 19 somewhat shorter than the upright part 18, and having a front to rear slot 20. The base or pedestal 17 has in its top a clamp screw 21 extending through the slot 20 and having fixed on it a handle 22, with a flange 23 facing down and engaging against the top of the adjusting plate part 19, thereby to hold the adjusting plate in various forwardly and rearwardly adjusted positions. The bottom 24 of this base or pedestal 17, which is preferably circular as shown, has diametrically opposite openings, and the machine base extension 3 has pins 25 extending upward and fitting snugly in the respective openings when the slice adjuster base 17 is set down thereover. The part 26 of this base extending up from the bottom part 24 to the top part 27 preferably is cylindrical and concentric with the bottom part 24, but much reduced in diameter and is hollow, and a considerably larger pin 28 is fixed in the machine base extension 3 and extends up so that the hollow adjuster base fits snugly thereon. With such a mounting the adjuster base, with the slice adjuster, may readily be lifted off the machine for thorough cleaning of the parts lifted off, as well as of the parts of the machine thus uncovered.

The upright part 18 of the slice-adjuster plate has its end toward the disc 12 concave, and has a guard extension 29 extending up concentric with the disc 12; while the guard structure 11 preferably has a curved strip 30 slidable circumferentially of the disc 12 and adapted, when the slice adjuster is adjusted far enough forward, to coincide with the guard extension 29. It will be understood, however, that this strip 30 may be slid up around the guard structure 11 so that its lower end passes the edge 31 of the guard structure 11, which latter is terminated at the side toward the feeding mechanism above described, high enough to allow the passage of the largest piece of meat, or the like, carried by the carriage 5.

The support and guard structure 11 is so arranged and the disc 12 is so journaled that this disc 12 has its peripheral plane inclined so that the carriage 5 has a feeding advance at an angle away from this plane of the disc periphery. I find in practice that the best results are obtained when this angle is about two degrees. The motor 13 and the driving elements 14, 15 and 16 of course are also inclined accordingly.

Figure 2:
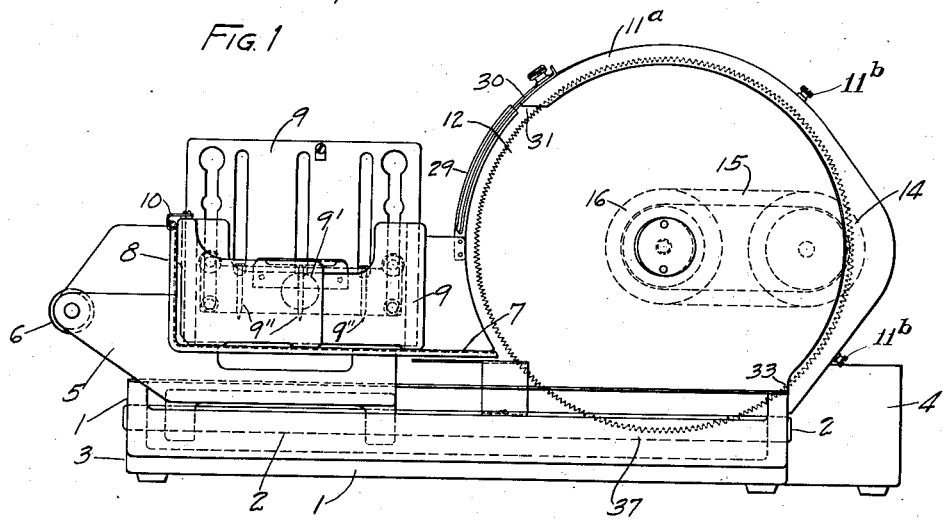
Fig. 2 is a front elevation of the same.
Figure 3:
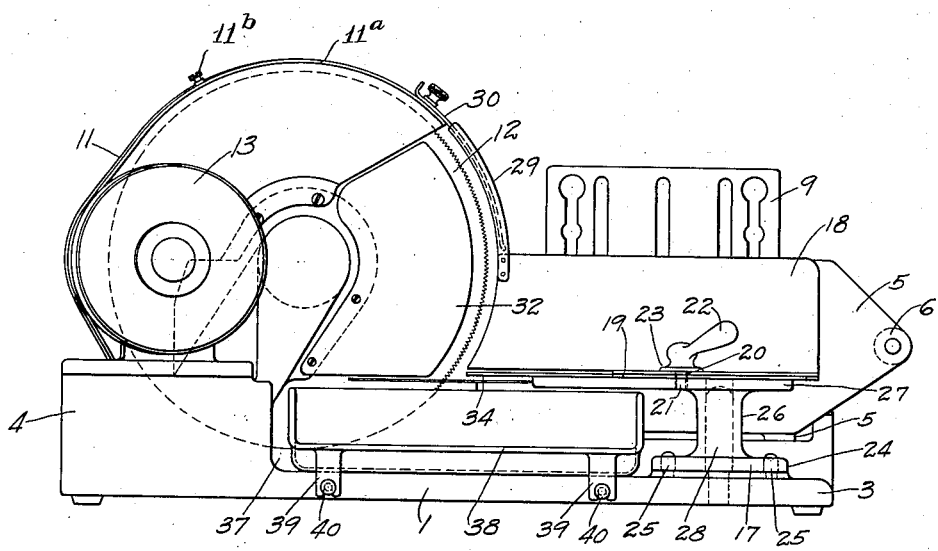
Fig. 3 is a rear elevation of the same.
Figure 4:
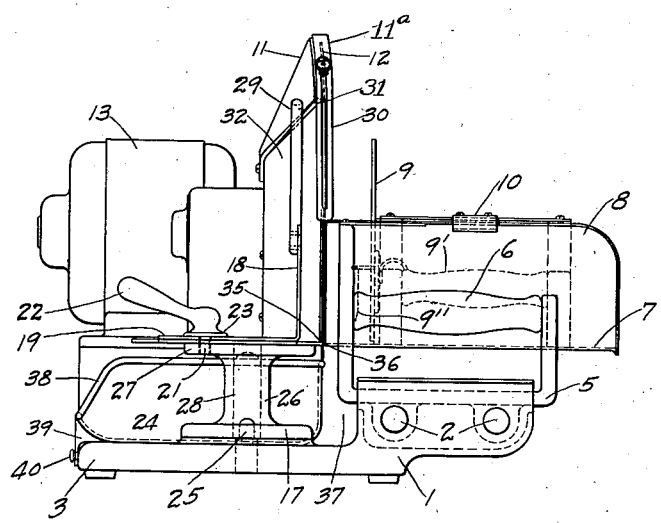
Fig. 4 is a feed end elevation of the same.
Figure 5:
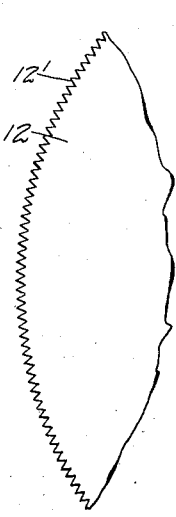
Fig. 5 is a partial side elevation enlarged, of the toothed disc.

The rear of this guard structure 11 is extended rearwardly a considerable distance in its central portion, and extends out near to the periphery of the disc 12 in such a manner that its peripheral termination presented oppositely to the direction of feeding advance of the carriage 5, inclines away from the disc 12 in said feeding direction, as is best seen in Fig. 1; thus forming a spreader 32 at the side of the disc 12 remote from the path of the carriage 5 to spread the material apart as it is being sliced, as will later be more fully described. The guard structure 11 preferably extends in front of the disc 12 radially inwardly just enough to cover the teeth of the disc and extends from its upper termination 31 before mentioned, over and downward in feeding direction with its other end 33 close to the adjacent end of the base 1, just to the rear of the forward part which contains the guide bars 2, as best seen in Fig. 2.

The top of the pedestal 17 has an extension 34 in feeding direction terminating slightly inward from the periphery of the disc 12 along the lower edge of the path of the material carried by the carriage 5 for slicing. The front edge 35 of this top and the adjacent rear edge 36 of the carriage plate 7 are parallel in feeding direction, and are as close together as it is practical to make them; the pedestal extension 34 being recessed where it extends past the rear of the disc periphery. Below the disc 12 from this extension 34 to the lower end 33 of the guard structure 11, an ample space 37 is left between the disc 12 and the bed for escape of bone dust for the reasons above mentioned.

In the space between the rearward bed extensions 3 and 4, the tray 38 is removably mounted by means of crotched lugs 39 fitting down on the headed extensions 40 in the rear edge of the machine base 1; this tray catching the slices as they come from the feeding and cutting mechanism.

Figure 6:
Fig. 6 is a partial diametrical cross section of the same.

The disc 12, as is best illustrated in Fig. 6, is of radially outwardly diminishing thickness. The preferred formation is as shown; with an inner thick central part 12a having its opposite sides parallel, with the tapered part 12b extending annularly from this part 12a, with a taper out to the peripheral part 12c which begins some distance inward from the teeth 12', and has its opposite sides parallel. A preferred example of the proportions of this disc is very clearly described by saying that if the disc is 13" in diameter, the central part 12a is 2½" in diameter, and the outer part 12c extends inwardly 1" from the outer tips of the teeth 12'; with the result that the angle between the opposite sides of part 12b is about one and a half degrees. However, it will be understood that exact dimensions are dependent upon varying conditions and sizes of machines, and are not to be taken as having any bearing on the scope of my invention.

The inclination above described preferably is confined to one side of the disc; the front side being preferably substantially plane.

Figure 7:
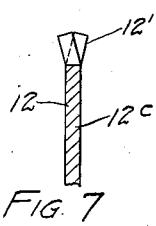
Fig. 7 is a similar view considerably enlarged, better showing the peripheral part of the disc and the set of the teeth.

The teeth 12' preferably are of depth about four times their thickness. Also preferably each tooth is symmetrical with respect to a radial line through it peripheral point; and the teeth are set alternately in opposite directions symmetrical to a median plane through the middle of their bases and parallel with the plane front side of the disc, as is best shown in Fig. 7. An example of the preferred dimensions of these teeth for the 13" diameter disc above described would be ⅛" tooth depth and $\frac{1}{32}$" tooth thickness; with the set of the teeth such that the planes of their inner corners would be about $\frac{1}{16}$" apart. However, these dimensions also are not to be taken as limiting the scope of my invention.

*Operation.*—The slice adjuster is set until its upright 18 is a distance back from the periphery of the disc 12 equal to the thickness of the slices to be cut. The holder 9 is adjusted forward away from this plate, sliding along the top edge of the wall 8, the operator grasping the handle 9' for this. By means of the handle 9a the spurs 9" are slid upward and the meat brought against the face of the holder, and then these spurs 9" are slid downward into the meat. These spurs 9" being spaced relatively widely apart and being few in number, are adapted to avoid contact with the bone in the meat; and if one of the spurs should contact with the bone, the meat almost always by only a slight shifting, may bring the bone out of the path of the one spur 9" without getting in the way of another spur. Thus the meat is very conveniently secured in the holder 9 by the usual operation of such holders, notwithstanding that the meat contains one or more bones.

The holder then is pushed backward until the rear end of the piece of meat and the bone contact with the front face of the slice-adjuster part 18. The disc 12 being rapidly revolving over and downward toward the meat, cuts into the meat as the carriage 5 is slid toward the disc in the manner of operation of numerous slicing machines of this type; and when the bone reaches the disc its teeth 12' saw the bone with the same facility as if they were cutting the meat.

This facility of cutting is due to a large extent to the taper in cross section of the disc, as well as its correct formation and set of teeth, as above described. However, another very important factor in this is the inclination of the disc as a whole away from the path of the material being cut, together with the spreader 32 at the rear, as well as the open space 37 below the disc 12. Some inclination of the disc in this respect as well as an element corresponding to the spreader 32, are not original in the present invention; these being disclosed in my prior applications, Ser. No. 421,525, filed Jan. 17, 1930, and Ser. No. 425,152, filed Feb. 1, 1930.

However, in the present case these provisions are of especial value and are a far more material factor in the successful operation of this machine for cutting composite meat and bone material. The reason for this is that the body of the meat held in the carriage 5, is in effect traveling away from the front face of the disc 12, substantially precluding any tearing of the meat by the disc teeth 12'; and the spreader 32 is forcing the slices of meat and bone backward and spreading it away from the body of meat, thereby also contributing to the prevention of tearing of the meat. The effect here is much the same as the beneficial one attained for instance in cutting a piece of meat with a knife held in the hand if the operator can, by the aid of another person or by some equivalent means, continually pull the body of the meat and the slice apart as the knife is advanced between them, attaining easy and smooth cutting even if the knife were dull, or if it were toothed.

Not only does this substantial spreading of the meat portions facilitate the cutting without tearing; the portions are kept so far apart and away from the disc 12 that the bone dust resulting from the sawing of the bone passes easily down between the spread apart portions and past them in the space 37, without lodging on the meat with the highly objectionable results hereinbefore referred to.

The extension of the part 34 in past the disc periphery close to the adjusting edge 36 of the carriage 5, affords a very important advantage in the last stage of cutting of the slice; as the closely adjusting edge 36, together with this part 34, amply support the last rear corner portion of the meat against the dragging and tearing action of the disc teeth 12', so that this last portion is as cleanly cut as any of the other parts of the slice.

Another very specific description may be given which will greatly aid in the understanding of the successful operation of this machine in mentioning that the speed of the 13" disc above mentioned is about 1800 R. P. M., or about the speed of the motor 13 if it is a standard medium speed motor, which is the kind most economically applied to these machines. The teeth 12' thus have a lineal velocity of about 6,000 ft. per min., more adapted to cut smoothly through the softer kinds of meat, such as steak and the like, and very cleanly cutting the bone, although the bone does not have a very rigid support by such softer kind of meat. With respect to the rear spreader 32 spreading the bone as it is sawed, it is well to consider that bone is not by any means rigid, but rather elastic and is tubular so that it will spread as fast as it is cut without splintering the bone. In practice it is found that the carriage 5 may be reciprocated very rapidly, slicing off the meat and bone smoothly and rapidly, and in correct condition as above mentioned.

As is required, I have somewhat specifically illustrated and described my invention herein, but it will be understood that numerous modifications may occur in practice, and therefore I am not limited to such precise disclosure but what I claim as new and desire to secure by Letters Patent, is:—

1. In a machine for slicing a composite meat and bone material comprising a rotary disc with a toothed periphery and means for bringing said periphery and the material into relation whereby the material including the meat and bone is sliced by said disc, means adjacent said periphery with sides diverging therefrom against which the pieces of material contact as the slicing proceeds to spread apart the body of the material and the slice being cut therefrom, said machine being open below said means for free passage of bone dust which is prevented from lodging on the meat due to the separation by means as aforesaid.

2. A machine as set forth in claim 1 in which the means for separating the body of material and the slice is at one side of the disc and in which the opposite side of the disc diverges away from the path of relative movement of the disc and material so that the meat and bone tend to progressively separate from this opposite side of the disc as the slicing progresses further to insure passage of the bone dust downward without contact with the meat.

3. A machine as set forth in claim 1 in which the means for separating the body of meat and bone and the slice cut therefrom is set inward toward the center of the disc a material distance whereby the bone as it is being sliced by the disc, has its partially sliced portion gradually spread from its body portion with the spreading beginning at the toothed periphery of the disc so that the divergence of the pieces of bone is minimized to avoid distorted slicing of the bone or breaking or splintering thereof and yet allow free passage of the bone dust from between the pieces of the bone without lodging on the portions of the meat.

ELMER G. STRECKFUSS.